United States Patent
Kim et al.

(10) Patent No.: US 7,428,215 B2
(45) Date of Patent: Sep. 23, 2008

(54) DEVICE FOR FILTERING OUT NULL PACKET FOR MPEG-2 TRANSMISSION

(75) Inventors: Yong-Deok Kim, Seoul (KR); Jun-Ho Koh, Suwon-si (KR); Chan-Yul Kim, Bucheon-si (KR); Yun-Je Oh, Yongin-si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 927 days.

(21) Appl. No.: 10/771,942

(22) Filed: Feb. 4, 2004

(65) Prior Publication Data

US 2005/0047341 A1 Mar. 3, 2005

(30) Foreign Application Priority Data

Aug. 25, 2003 (KR) .................. 10-2003-0058895

(51) Int. Cl.
*H04J 1/16* (2006.01)
*H04J 3/14* (2006.01)

(52) U.S. Cl. ...................... 370/229; 370/477

(58) Field of Classification Search ................. 370/229, 370/230, 235, 389, 401, 477
See application file for complete search history.

(56) References Cited

U.S. PATENT DOCUMENTS

| | | | |
|---|---|---|---|
| 2003/0133446 A1* | 7/2003 | Schoenblum | 370/356 |
| 2003/0196078 A1* | 10/2003 | Wise et al. | 712/300 |
| 2007/0091917 A1* | 4/2007 | Schoenblum | 370/464 |
| 2007/0113141 A1* | 5/2007 | Choi et al. | 714/751 |

* cited by examiner

*Primary Examiner*—Ajit Patel
(74) *Attorney, Agent, or Firm*—Cha & Reiter, LLC

(57) ABSTRACT

Disclosed is a device for filtering out a null packet in a data stream for example an MPEG-2 TS (Transport Stream) to avoid bandwidth waste when it is transmitted to a backbone network. The device includes a plurality of receiving interfaces, a filter unit, and a controller. The receiving interfaces receive parallel data, such as DVB-ASI (Digital Video Broadcasting-Asynchronous Serial Interface) inputs as channel-by-channel MPEG-2 data. The filter unit counts the respective numbers of data packets and non-data packets of the data input from the receiving interfaces and filters a null packet in the data. A network transmission unit transmits the filtered data to a backbone network. The controller calculates a bit rate based on both of the count numbers received from the filter unit.

11 Claims, 5 Drawing Sheets

DEVICE FOR FILTERING OUT NULL PACKET FOR MPEG-2 TRANSMISSION

CLAIM OF PRIORITY

This application claims priority to an application entitled "DEVICE FOR FILTERING OUT NULL PACKET FOR MPEG-2 TRANSMISSION," filed in the Korean Intellectual Property Office on Aug. 25, 2003 and assigned Ser. No. 2003-58895, the contents of which are hereby incorporated by reference.

BACKGROUND OF THE INVENTION

1. Field of the Invention

The present invention relates to an optical communication method or system, and more particularly, to the transmission of an MPEG-2 TS (Moving Picture Experts Group-2 Transport Stream).

2. Description of the Related Art

Digital broadcasting that employs an MPEG-2 TS for video/audio data transmission has recently rapidly spread world wide. MPEG-2 has a variable bit rate (VBR) property. Moreover, it performs data compression using an algorithm which refers to the past frame to compress only the changed part into a stream data. For example, a low mobility image captured in a studio is compressed at a low bit rate. Further, a high mobility image having a large amount of frame change, captured at a sports game, etc., is compressed at a sharply increased bit rate.

However, in many cases, MPEG-2 data having a VBR property is transmitted in a constant bit rate (CBR) fashion to viewers. However, bandwidth prediction and assurance issues are taking into consideration.

For example, in Korea, regular terrestrial digital broadcasting has been provided to the metropolitan areas since 2001. This digital broadcasting employs an 8-level vestigial sideband (8-VSB) mode according to the American advanced television systems committee (ATSC) specifications. In particular, MPEG-2 video/audio data is transmitted at 19.39 Mbps in a CBR fashion via a radio frequency (RF) spectrum band of 6 MHz for one channel. In such terrestrial or cable broadcasting, MPEG-2 data is modulated and demodulated in an 8-VSB or QAM mode, respectively, before and after it is transmitted. In addition, MPEG-2 data transmission is performed mainly in a CBR fashion.

In the meantime, a time division multiplexing (TDM) scheme is used in a backbone network (such as a synchronous digital hierarchy/synchronous optical network (SDH/SONET), or in a plesiochronous digital hierarchy (PDH) network) provided between broadcast stations, program providers (PP) or system operators (SO).

Thus, if data received in a CBR fashion is transmitted without alteration to the TDM-based backbone network, it may cause an excessive and needless waste of bandwidth.

FIGS. 1a and 1b illustrate a conventional connection of an MPEG-2 TS to a backbone network.

As shown in FIG. 1a, an MPEG-2 TS of a CBR or VBR mode received through a DVB-ASI input is converted into a CBR mode through a Remux 101. It is then transmitted to a backbone network through a network transmission unit 102. As shown in FIG. 1b, a received MPEG-2 TS of a VBR or CBR mode is directly transmitted to the backbone network through the network transmission unit 102.

The Remux 101 shown in FIG. 1a is digital broadcasting equipment capable of changing the bit rate of an MPEG-2 TS. It is frequently used in a broadcast station headend. However, it is impossible to economically implement the Remux 101 in a practical digital cable broadcasting system, for example, with tens to hundreds of channels. Moreover, the cost of this is very high, for example, $50,000. In order to match or adapt an MPEG-2 TS into an SDH/SONET or an ATM network as shown in FIG. 1a, the bit rate of the MPEG-2 TS must be checked if it is in a range that can be accompanied by the network into which the MPEG-2 TS will be matched. Further, the bit rate must be forced through the Remux 101 to be reduced, if the bit rate exceeds the range. In addition, for transmission through backbone networks, the data must be manipulated according to the respective standards of the backbone networks, for example, in the network transmission unit 102 shown in FIGS. 1a and 1b.

A received MPEG-2 TS of a CBR mode is transmitted to the backbone network. If unnecessary null packets, included in the MPEG-2 TS for the CBR, are also transmitted, this leads to an unnecessary use of bandwidth of the backbone network. This, in turn, causes a waste of bandwidth. For example, when an MPEG-2 TS is adjusted to a CBR for ATSC terrestrial transmission at 19.39 Mbps or for other uses, null packets may/are used to fill in the MPEG-2 TS only for unifying the bit rate. These are transmitted through a TDM-based transmission network and cause an unnecessary waste of bandwidth. Thus, the economic burden of the system is increased.

Terrestrial digital broadcasting can be carried out even when cable broadcasting has not yet been digitalized (as in Korea) or when not all broadcasting equipment is implemented for supporting HD broadcasting at 20 Mbps to 27 Mbps levels. In these situations, the data is received by SD-level broadcasting at about 3 Mbps. It is then broadcasted by HD-level broadcasting using null packets. This causes problems in that the amount of unnecessary null packets filled in the data is 5 to 8 times larger than real data that is transmitted.

When an MPEG-2 TS is transmitted through a TDM-based backbone network, there is thus a need for a device capable of transmitting the desired broadcast information without loss. In addition, the device should not cause bandwidth waste in the TDM-based backbone network.

SUMMARY OF THE INVENTION

Therefore, the present invention has been made in to reduce or overcome the above limitations in the prior art. One object of the present invention is to provide a device for filtering out null packets. For example, a null packet in an MPEG-2 TS (Transport Stream) of a CBR format is removed to avoid a waste of bandwidth when the MPEG-2 TS is transmitted to a backbone network.

Another object of the present invention to provide a device for filtering out null packets, whereby Ethernet data, QAM information, VOD information, etc., can be additionally inserted into a bandwidth saved by removing the null packets. This insertion is according to a surplus bit rate.

Still another object of the present invention to provide a device for filtering out null packets, whereby the bit rate of an MPEG-2 TS is calculated and the bit rate of each channel is monitored in a processor or a QAM unit to protect important data. A quality of service (QoS) scheme can be selected, thereby guaranteeing the QoS of important multimedia data.

In accordance with the principles of the present invention, a device for filtering out null packets is provided, the device comprising a plurality of interfaces for receiving parallel data, a filter unit to determine respective numbers of data packets and non-data packets of the data from the receiving interfaces and filtering a null packet in the data, and a controller to determine a bit rate based on the respective numbers of the data packets and the non-data packets of the data.

BRIEF DESCRIPTION OF THE DRAWINGS

The present invention will be more clearly understood from the following detailed description taken in conjunction with the accompanying drawings, in which.

DETAILED DESCRIPTION OF THE PREFERRED EMBODIMENTS

Now, preferred embodiments of the present invention will be described in detail with reference to the annexed drawings. In the following description, a detailed description of known functions and configurations incorporated herein will be omitted when it may make the subject matter of the present invention rather unclear.

Figure 1:
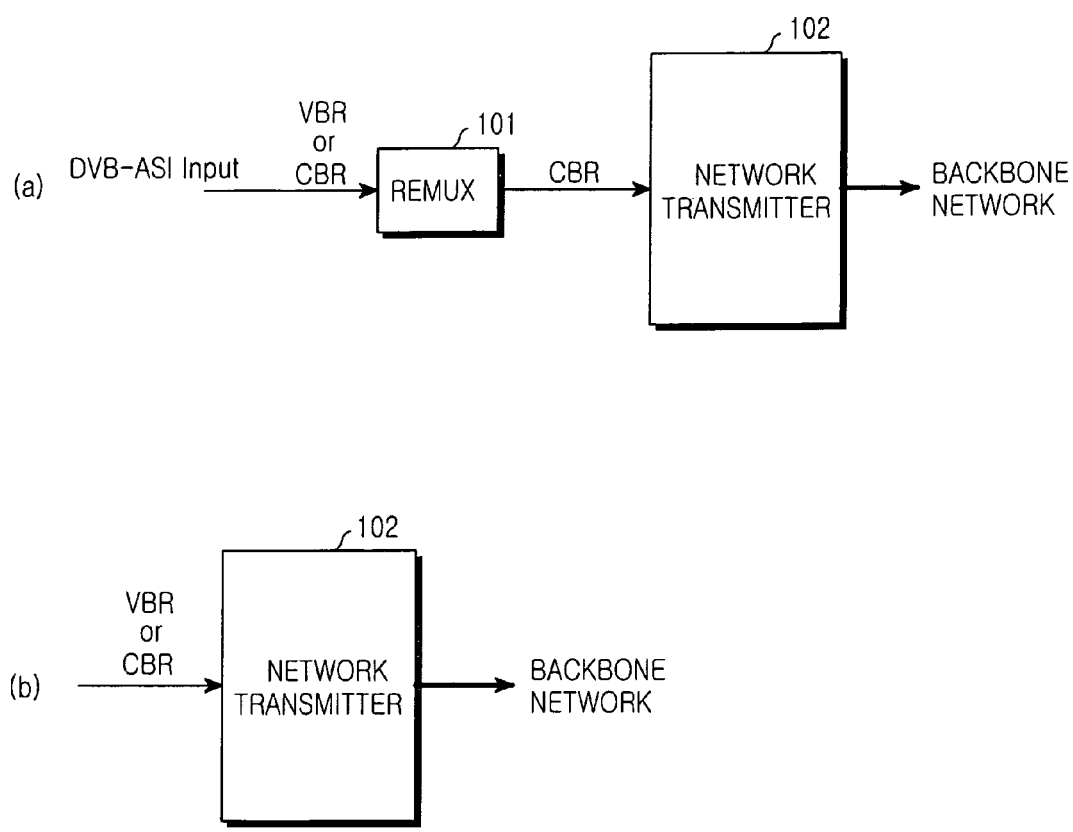
FIGS. 1a and 1b illustrate a conventional connection of an MPEG-2 TS to a backbone network.
Figure 2:
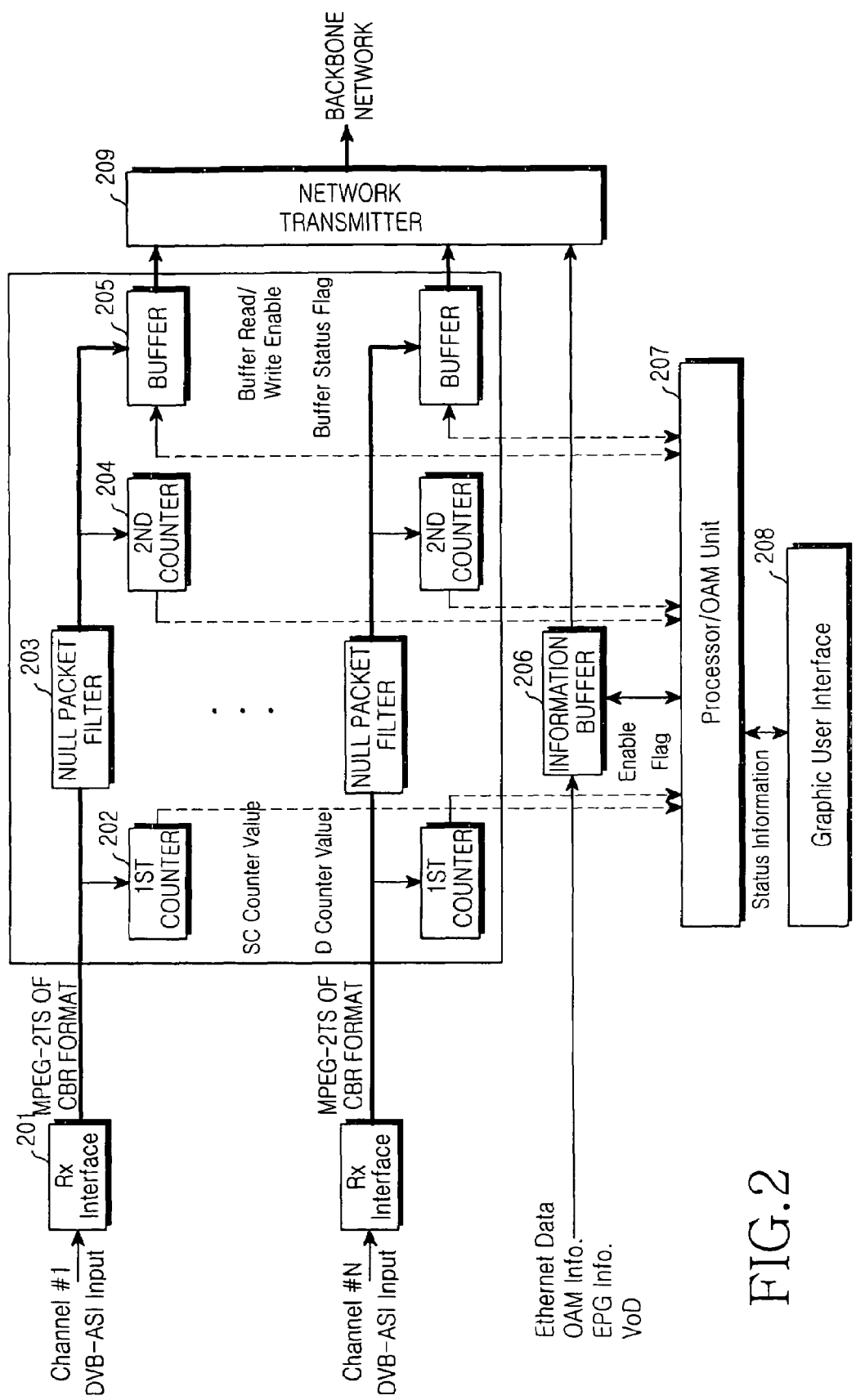
FIG. 2 is a block diagram showing a device for filtering out null packets for the transmission of an MPEG-2 TS to a backbone network, according to an embodiment of the present invention.

FIG. 2 is a block diagram showing a device for filtering out null packets for the transmission of an MPEG-2 TS to a backbone network, according to an embodiment of the present invention.

As shown in FIG. 2, the null packet filtering device according to the present invention includes receiving interfaces 201, a network transmission unit 209, an information buffer 206, a processor/QAM unit 207, a graphic user interface 208, and an FPGA. The receiving interfaces 201 receive, on a channel-by-channel basis, N channels of parallel digital video broadcasting-asynchronous serial interface (DVB-ASI) inputs. The network transmission unit 209 transmits an MPEG-2 TS to a backbone network. The information buffer 206 stores Ethernet data, QAM information, EPG information, etc. The processor/QAM unit 207 controls the operation of said constituent elements. The graphic user interface 208 allows a user to interface with the filtering device. The FPGA filters out a null packet in an MPEG-2 TS inputted from the receiving interface 201.

In particular, the FPGA includes first counters 202 for calculating the bit rate of data bits, null packet filters 203 for filtering out a null packet according to the header information of an MPEG-TS, second counters 204 for calculating the bit rate of data bits after the null packet is filtered out, and buffers 205 for input and output.

A detailed description will now be given of the operation of the null packet filtering device having such a configuration according to the present invention. The FPGA receives a total N number of DVB-ASI inputs through the receiving interfaces 201. For exemplary purposes, the following description of the present invention will be made for one channel.

The receiving interface 201 in FIG. 2 is composed of a commercial chip or a PLD/FPGA, thus, a detailed description thereof will be omitted.

The receiving interface 201 outputs an MPEG-2 transport packet (TP). The MPEG-2 TP includes MPEG parallel data and a special character/data (SC/D) field as a flag signal indicating whether data is currently outputted.

Figure 5:
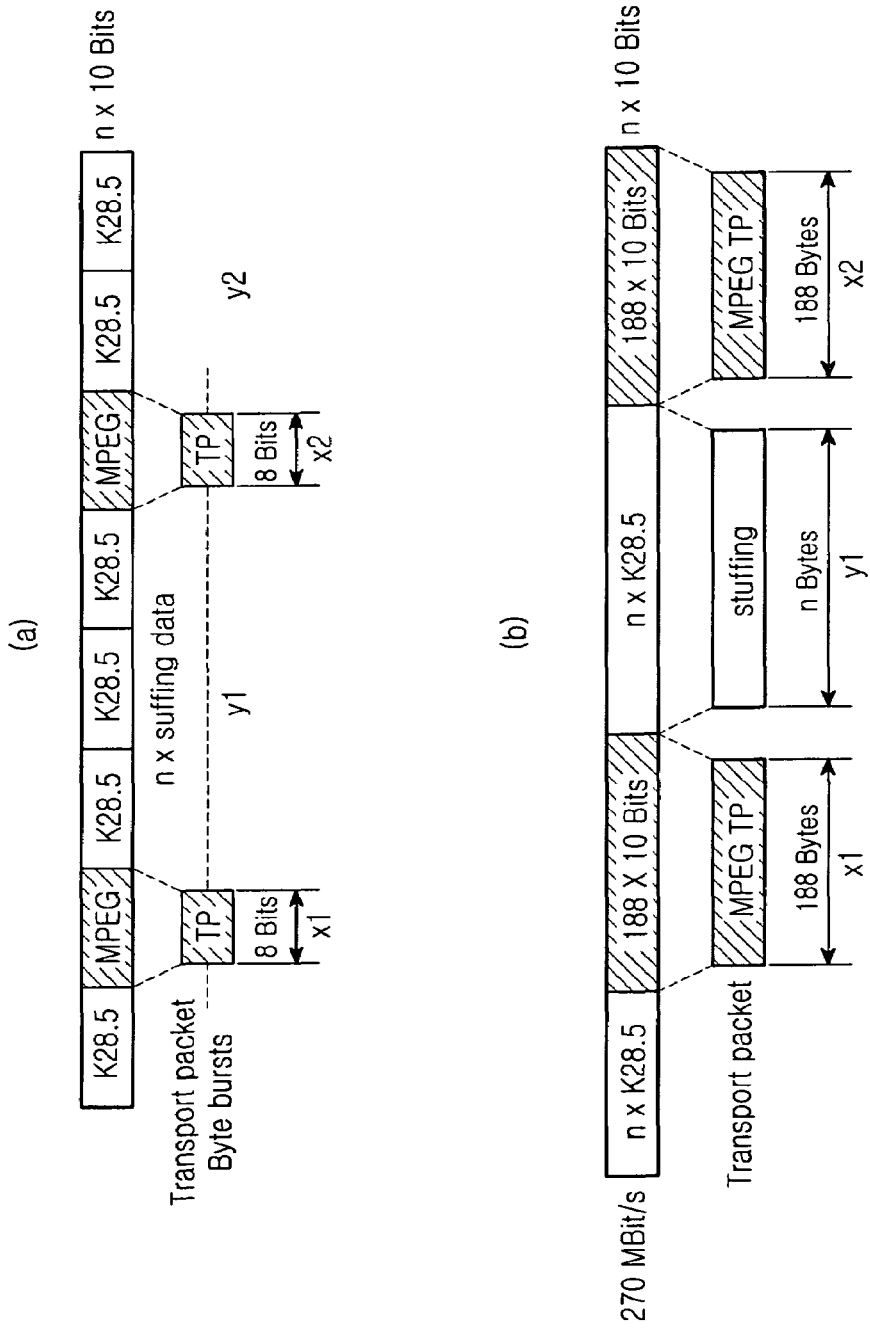
FIG. 5 illustrates a transmission block of an MPEG-TS in an FPGA shown in FIG. 2.

When an MPEG-2 TP is transmitted in a DVB-ASI scheme, it has two modes, (1) a spread mode as shown in FIG. 5a and (2) a burst mode as shown in FIG. 5b. In the spread mode, MPEG-2 data is transmitted one byte at a time. In addition, K28.5 characters are filled between two adjacent MPEG-2 data, as shown in FIG. 5a. In the burst mode, MPEG-2 data is transmitted one packet at a time. Each packet is composed of 188 bytes, and n K28.5 characters are filled between two adjacent packets. In the two modes, if a transport packet (TP) is output from the receiving interface 201. Moreover, it is transferred to the FPGA with a flag signal having a value of 0 to indicate that it is "Data". If a K28.5 character is outputted, it is transferred to the FPGA with a flag signal having a value of 1 to indicate that it is "Special Character".

Details of the MPEG-2 transmission based on the DVB-ASI are described in the following standards: "European Standard (CENELEC): EN50083-9" and "DVB Standard: ETSI TR 101 891 v1.1.1"

Referring to FIG. 2, when an MPEG-2 TP is input to the FPGA through the receiving interface 201, the first counter 202 discriminates a data packet or a special character packet based on the SC/D field in the MPEG-2 TP. It also counts the respective numbers of the discriminated data packets and special character packets. The first counter 202 transmits the count information to the processor/QAM unit 207. This is used by unit 207 to calculate the bit rate of data packets from among the total input. The first counter 202 also handles a null packet as a data packet. The operation thereof is performed according to the entire synchronization clock of the FPGA.

The bit rate is calculated by the following equation.

$$\text{bitrate(Mbps)} = 270\,\text{Mbps} \times \frac{8}{10} \times \frac{x}{x+y} \qquad \text{[Equation 1]}$$

Here, "x" denotes the count number of MPEG-2 data packets, and "y" denotes the count number of special character packets (or stuffing data packets).

In this bit rate calculation equation, "270 Mbps" is the transmission speed of a DVB-ASI physical layer. A factor "8/10" is attributed to 8 B/10 B encoding/decoding. It can also be seen from FIGS. 5a and 5b that 10 bits are converted to 8 bits.

The null packet filter 203 analyzes the header of received MPEG-2 data. If the analysis result is that a null packet has been received, the null packet filter 203 prevents it from being output therefrom. Otherwise the filter 203 permits it to be outputted as received. That is, the null packet filter 203 functions to filter out null packets. This null packet filtering operation will be described later in more detail with reference to FIG. 3.

The second counter 204 counts the respective numbers of data packets and special character packets after they are subjected to the null packet filtering. It also transmits the count information to the processor/QAM unit 207 so as to allow the unit 207 to calculate a new bit rate. This bit rate is calculated also based on the above Equation 1.

Since it has a non-uniform data rate (i.e., a variable bit rate)), the data remaining after filtering is first stored in the buffer 205 before transmission. The buffer 205 then transmits a buffer status flag to the processor/QAM unit 207. It also transmits the stored data to the network transmission unit 209 when receiving a corresponding buffer write/read enable signal from unit 207.

The network transmission unit 209 may include an ATM network adapter capable of making a connection to an ATM network, or an NG-SDH product class capable of accompanying all the ATM, the IP, etc. Particularly, the network transmission unit 109 is an interface unit for transmission to a backbone network. The device therefor is classified according to what kind of a backbone network it is connected to.

The information buffer 206 allows additional bandwidth utilization by calculating an available data bit rate based on: (1) the bit rate, calculated in the processor/QAM unit 207, of an MPEG-2 TS from which a null packet is filtered out, and (2) the capacity of a backbone network to which the network transmission unit 209 is connected. The kind of data to be additionally transmitted through the information buffer 206 varies depending on the number of MPEG-2 TS channels and an average surplus bandwidth statistically calculated in the actual use. For example, if the total sum of the bit rates of the channels is, on average, smaller than the capacity of a network connected to the network transmission unit 209 by 10M/100M/1 Gbps, Ethernet data of 10M/100M/1 GbE can be allocated to the corresponding surplus bandwidths, respectively. On the other hand, if it is difficult to predict the surplus bandwidth (since it is irregular) other information can be transmitted, for example, information for communication between devices constituting the network, or information on each channel that is regularly transmitted, or VoD data that can be buffered in the receiving end.

The graphic user interface (GUI) 208 is a general use computer connected to the null packet filtering device through a UART, an Ethernet or an RS-232. The GUI 208 informs the user of both the bit rate (CBR) of each MPEG-TS channel input and the bit rate (VBR) of each channel output after the null packet is filtered out. The user can thus know statistically the amount of surplus bandwidth based on the bit rate information of each channel. This allows the user to determine what kind of data (or which attribute of data) will be additionally allocated to the surplus bandwidth. It can then appoint the determined additional-allocation data to be transmitted through the information buffer 206.

Figure 3:
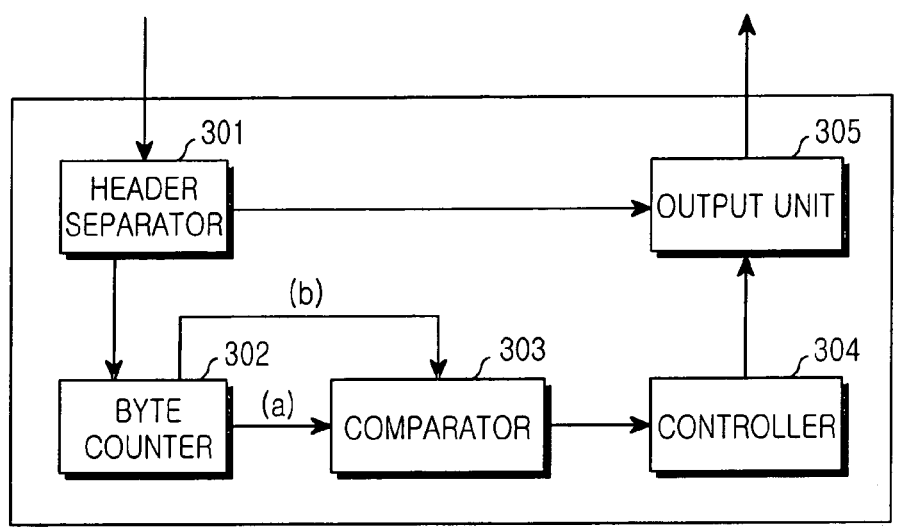
FIG. 3 is a block diagram of a null packet filter in the null packet filtering device according to the present invention.

FIG. 3 is a block diagram of a null packet filter 203 in the null packet filtering device according to the present invention.

As shown in FIG., the null packet filter 203 includes a header separator 301, a byte counter 302, a comparator 303, a controller 304 and an output unit 305.

Figure 4:
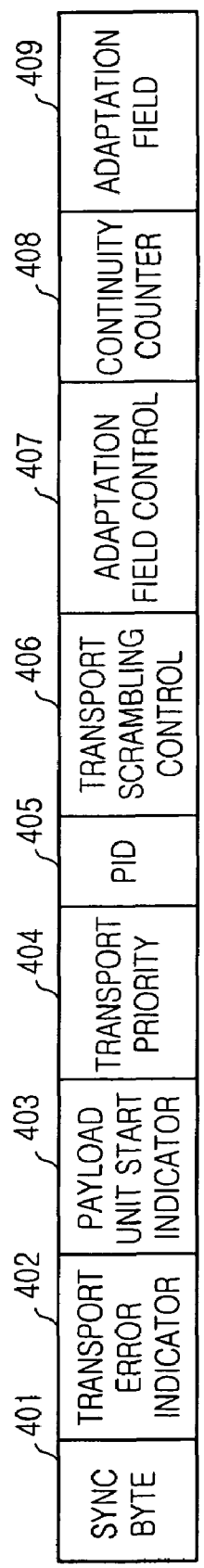
FIG. 4 illustrates a header of an MPEG-TS which is applied to the present invention.

The header separator 301 separates the header of a received MPEG-2 packet to determine whether it is a null packet. The present invention employs a null packet determination method, for example, by searching for a packet having an MPEG-2 packet identification (PID) value of 13 binary bits "1111111111111", as a null packet. For reference, the overhead part of an MPEG-2 packet composed of 188 bytes is illustrated in FIG. 4. The overhead part of an MPEG-2 packet is well known in the art.

The byte counter 302 receives the separated header and outputs it in byte units. The counter 302 counts the output bytes to determine what information the current byte contains. The second and third bytes are of particular interest in performing the null packet checking process of the present invention. This is because the last 5 bits of the second byte and 8 bits of the third byte are combined to represent the information of the PID 405. The byte counter 302 outputs the byte count number (b) and the header data (a) simultaneously to the comparator 303.

If it receives byte count numbers of 2 and 3 and a corresponding data value of "1111111111111" from the byte counter 302, the comparator 303 determines that the corresponding packet is a null packet. It then transmits the determination result to the controller 304.

Upon receipt of the determination result information (indicating that the received packet is a null packet, from the comparator 303) the controller 304 transmits an output control signal to the output unit 305. This control signal is used to prevent the entire received packet (composed of 188 bytes in the embodiment of FIG. 5*b* according to the present invention) from being output from the output unit 305.

The output unit 305 outputs an MPEG-2 packet received through the header separator 301 based on the control signal from the controller 304.

In the rapidly changing and developing digital broadcast and video on demand (VOD) service markets, a large amount of content is produced in an MPTS format. Thus, taking advantage of the MPEG-2 system standard. Accordingly, a device for filtering out null packets according to the present invention is advantageous in that it can save bandwidth by removing unnecessary MPEG-2 null packets, which are inserted in the data for conversion into the CBR before transmission to a backbone network.

The present invention is also advantageous in that Ethernet data, QAM information, VOD information, etc., can be effectively inserted into the saved bandwidth according to the surplus bit rate.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

In particular, although the above embodiment of the present invention has determined if a packet is a null packet, using a PID value of "1111111111111", those skilled in the art will appreciate that such a null packet determination method or the specific PID value is provided only for illustrative purposes.

What is claimed is:

1. A device for filtering null packets for use with a transmission device that transmits data to a backbone network, the device comprising: a plurality of interfaces for receiving parallel data; a filter unit to determine respective numbers of data packets and non-data packets of the data from the interfaces and to filter null data packets in the data from the interfaces ; and a controller to determine a bit rate based on the respective numbers of the data packets and the non-data packets of the data after filtering the null data packets.

2. The device as set forth in claim 1, further comprising a network transmission unit for transmitting the filtered data to the backbone network.

3. The device as set forth in claim 2, wherein the transmission device is a MPEG-2 transmission device that transmits MPEG-2 data.

4. The device as set forth in claim 3, wherein the plurality of interfaces includes receiving digital video broadcasting-asynchronous serial interface inputs as channel-by-channel MPEG-2 data in parallel.

5. The device as set forth in claim 4, wherein the backbone network is a TDM-based backbone network.

6. The device as set forth in claim 5, further comprising an information buffer for data transmission in correspondence with a difference between the backbone network's bandwidth and the calculated bit rate.

7. The device as set forth in claim 5 or 6, wherein the filter unit includes:

a first counter for discriminating a data packet or a special character packet in the MPEG-2 data input to the filter unit, and counting respective numbers of the discriminated data packets and the discriminated special character packets, and transferring the count information to the controller;

a null packet filter for discriminating a null packet using header information in the MPEG-2 data passing by the first counter, and filtering the null packet;

a second counter for discriminating a data packet or a special character packet in the filtered MPEG-2 data and counting respective numbers of the discriminated data packets and the discriminated special character packets, and transferring the count information to the controller; and a buffer section for outputting the filtered MPEG-2 data to the network transmission unit.

8. The device as set forth in claim 6, wherein the data transmitted through the information buffer includes one of Ethernet data, QAM information and EPG information.

9. The device as set forth in claim 7, wherein the bit rate calculation uses the following equation:

$$\text{bitrate(Mbps)} = 270 \, \text{Mbps} \times \frac{8}{10} \times \frac{x}{x+y},$$

wherein "x" denotes the count number of data packets, and "y" denotes the count number of special character packets, "270 Mbps" is the transmission speed of a DVB-ASI physical layer, and a factor "8/10" is attributed to 8 B/10 B encoding/decoding.

10. A method for filtering null packets in data transmission to a backbone network, the method comprising the steps of: receiving parallel data in a plurality of interfaces; determining respective numbers of data packets and non-data packets of the data from the interfaces; filtering null data packets in the data from the interfaces; and determining a bit rate based on the respective numbers of the data packets and the non-data packets of the data after filtering the null data packets.

11. The method as set forth in claim 10, further comprising the step of transmitting the filtered data to the backbone network.

* * * * *